United States Patent
Moradi et al.

(10) Patent No.: US 10,652,072 B2
(45) Date of Patent: May 12, 2020

(54) SYSTEMS, DEVICES AND METHODS FOR COMMUNICATING DATA OVER CIRCULARLY PULSE-SHAPED WAVEFORMS

(71) Applicant: Battelle Energy Alliance, LLC, Idaho Falls, ID (US)

(72) Inventors: Hussein Moradi, Idaho Falls, ID (US); Behrouz Farhang, Salt Lake City, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 15/593,691

(22) Filed: May 12, 2017

(65) Prior Publication Data
US 2017/0331663 A1 Nov. 16, 2017

Related U.S. Application Data

(60) Provisional application No. 62/335,976, filed on May 13, 2016.

(51) Int. Cl.
*H04L 27/34* (2006.01)
*H04L 27/26* (2006.01)
*H04B 7/0413* (2017.01)

(52) U.S. Cl.
CPC ........ *H04L 27/3494* (2013.01); *H04B 7/0413* (2013.01); *H04L 27/265* (2013.01); *H04L 27/2614* (2013.01); *H04L 27/2628* (2013.01); *H04L 27/2636* (2013.01)

(58) Field of Classification Search
None
See application file for complete search history.

(56) References Cited

U.S. PATENT DOCUMENTS

| 9,054,838 | B1* | 6/2015 | Harris | H04L 7/0037 |
| 2004/0086054 | A1* | 5/2004 | Corral | H04L 27/2614 375/260 |
| 2010/0039927 | A1* | 2/2010 | Noh | H04L 5/0007 370/210 |
| 2010/0061224 | A1* | 3/2010 | Noh | H04L 27/2607 370/210 |

(Continued)

FOREIGN PATENT DOCUMENTS

WO 2015033051 A1 3/2015

OTHER PUBLICATIONS

Berardinelli et al., "Zero-tail DFT-spread-OFDM signals", IEEE Globecom Workshops (GC Wkshps), Atlanta, (Dec. 2013) pp. 229-234.

(Continued)

*Primary Examiner* — Shuwang Liu
*Assistant Examiner* — Gina M McKie
(74) *Attorney, Agent, or Firm* — TraskBritt

(57) ABSTRACT

Circularly pulse-shaped waveforms for communication systems are disclosed herein, including a single carrier modulation in which pulse-shaping is performed using a circular convolution by the transmitter for various modulation schemes. A transmitter, related method, and corresponding receiver are also disclosed for demodulation of the single carrier circularly pulse-shaped signal and data extraction.

10 Claims, 8 Drawing Sheets

(56) References Cited

U.S. PATENT DOCUMENTS

| | | | |
|---|---|---|---|
| 2010/0080112 A1* | 4/2010 | Bertrand | H04L 27/2657 370/208 |
| 2010/0189132 A1* | 7/2010 | Fettweis | H04L 5/003 370/480 |
| 2012/0121032 A1 | 5/2012 | Sandhu | |
| 2013/0163542 A1* | 6/2013 | Fettweis | H04W 72/044 370/329 |
| 2014/0233437 A1 | 8/2014 | Abdoli et al. | |
| 2016/0105258 A1 | 4/2016 | Jia et al. | |
| 2016/0330265 A1* | 11/2016 | Abdoli | H04L 5/0028 |

OTHER PUBLICATIONS

Farhang-Boroujeny et al., "Derivation of GFDM based on OFDM principles", IEEE International Conference on Communications (ICC), London, UK, (Jun. 2015) pp. 2680-2685.

International Search Report from International Application No. PCT/US2017/032416, dated Sep. 18, 2017, 4 pages.

Martin, "Small side-lobe filter design for multitone data-communication applications", IEEE Transactions on Circuits and Systems II: Analog and Digital Signal Processing, vol. 45, No. 8, (1998) pp. 1155-1161.

Mirabbasi et al., "Overlapped complex-modulated transmultiplexer filters with simplified design and superior stopbands", IEEE Transactions on Circuits and Systems II: Analog and Digital Signal Processing, vol. 50, No. 8, (2003) pp. 456-469.

OFDM based Waveform for 5G new radio interface. Nokia et al. Apr. 2016 [retrieved on Sep. 2, 2017]. Retrieved from the internet: <URL http://www.3gpp.org/ftp/tsg_ran/WG1_RL1/TSGR1_84b/Docs/ > entire document.

International Written Opinion from International Application No. PCT/US2017/032416, dated Sep. 18, 2017, 6 pages.

Aminjavaheri et al., "Impact of Timing and Frequency Offsets on Multicarrier Waveform Candidates for 5G", in IEEE Xplore, Jan. 4, 2016 (presented at Signal Processing and Signal Processing Education Workshop (SP/SPE), Jan. 9-12, 2016).

Farhang-Boroujeny et al., "OFDM Inspired Waveforms for 5G", IEEE Communications Surveys & Tutorials, vol. 18, No. 4, (2016) pp. 2474-2492.

Farhang-Boroujeny, "OFDM versus filter bank multicarrier", IEEE Signal Processing Magazine, vol. 28, No. 3, (2011) pp. 92-112.

Huemer et al., "The potential of unique words in OFDM", Proc. 15th Int. OFDM-Workshop, Hamburg, Germany, (Sep. 2010) pp. 140-144.

Lin et al., "Multi-carrier modulation analysis and WCP-COQAM proposal", EURASIP Journal on Advances in Signal Processing, vol. 2014, No. 1, (2014).

Michailow et al., "Generalized frequency division multiplexing for 5th generation cellular networks", IEEE Transactions on Communications, vol. 62, No. 9, (Sep. 2014) pp. 3045-3061.

Morelli et al., "Synchronization techniques for orthogonal frequency division multiple access (OFDMA): A tutorial review", Proc. of the IEEE, vol. 95, No. 7, (Jul. 2007) pp. 1394-1427.

Qualcomm, "5G Waveform & Multiple Access Techniques", (Nov. 2015) 46 pages.

Reyhani et al. "Asynchronous performance of circularly pulse-shaped waveforms for 5G", arXiv:1511.07910, vol. 1, (Nov. 2015) 6 pages.

Reyhani et al., "Circularly Pulsed-Shaped Waveforms for 5G: Options and Comparisons", IEEE Xplore, Feb. 25, 2016 (presented at Global Communications Conference (Globecom) Dec. 6-10, 2015).

Chen et al., "Single carrier filtering system architecture for flexible frequency domain multiplexing uplink", 2015 IEEE International Conference on Communication Workshop (ICCW), IEEE, (Jun. 2015) pp. 1048-1053.

European Extended Search Report from European Application No. 17796939.1, dated Dec. 9, 2019, 10 pages.

Farhang-Boroujeny et al., "A comparison of linear FBMC and circularly shaped waveforms", 2016 IEEE/ACES International Conference on Wireless Information Technology and Systems (ICWITS) and Applied Computational Electromagnetics (ACES), IEEE, (Mar. 2016) pp. 1-2.

\* cited by examiner

SYSTEMS, DEVICES AND METHODS FOR COMMUNICATING DATA OVER CIRCULARLY PULSE-SHAPED WAVEFORMS

CROSS REFERENCE TO RELATED APPLICATION

This application claims the benefit of the filing date of U.S. Provisional Patent Application Ser. No. 62/335,976, filed May 13, 2016, the disclosure of which is hereby incorporated herein in its entirety by this reference.

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

FIELD

Embodiments of the present disclosure relate generally to systems, devices, and methods for generating circularly pulse-shaped waveforms by a transmitter, and processing the circularly pulse-shaped waveforms by a receiver, of a communication system.

BACKGROUND

As of today, orthogonal frequency division multiplexing (OFDM) has enjoyed its dominance as the most popular signaling method in broadband wired and wireless channels. Signal modulation using OFDM has been adopted in the broad class of digital subscriber line (DSL) standards, as well as in a majority of wireless standards, such as variations of IEEE 802.11 and IEEE 802.16, the third generation partnership program long-term evolution (3GPP-LTE), and LTE-Advanced. OFDM may be used in point-to-point and downlink communications because of its low complexity and high bandwidth efficiency. The low complexity of OFDM may be a consequence of the fact that each OFDM symbol is synthesized as a summation of a number of complex-valued sinusoidal signals (e.g., "pure tones") that are modulated by a set of quadrature amplitude modulated (QAM) data symbols. Moreover, channel distortion may be handled by adding a cyclic prefix (CP) to each OFDM symbol.

It has been noted that OFDM faces many challenges when adopted for use in more complex networks. For example, the use of OFDM during uplink of multi-user networks (e.g., orthogonal frequency division multiple access (OFDMA) networks) may require full synchronization of the users' signals at the base station input. Such synchronization has been found to be difficult to establish, particularly in mobile environments where Doppler shifts of different users are hard to predict and/or track. To address the problem of carrier and timing synchronization in OFDMA networks, resource intensive closed-loop procedures have been included to achieve the tight synchronization requirements for LTE and LTE-Advanced.

Some researchers have proposed replacing OFDM by filter bank multicarrier (FBMC) signaling. Although FBMC may overcome some of the problems of OFDM when multiple users in a network are asynchronous, application of FBMC to multiple-input and multiple-output (MIMO) channels may not be as straightforward as when OFDM is used. Other systems may include an alternative class of FBMC waveforms in which the linear convolutions used for sub-carrier filtering is replaced by circular convolutions. Generalized frequency division multiplexing (GFDM) and circular FBMC (C-FBMC) are two examples of members of this class of waveforms. GFDM waveforms may be non-orthogonal and, thus, may result in a more complex receiver than C-FBMC.

BRIEF SUMMARY

In some embodiments, a transmitting device comprises a transmitter having a processor and communication elements. The transmitter is configured to generate an output signal exhibiting a circularly pulse-shaped waveform constructed by using a circular convolution for pulse shaping during synthesis, apply an interpolation operation to the output signal to obtain the samples before data extraction occurs, reduce peak-to-average-power-ratio (PAPR) of the sampled output signal responsive to performing single carrier modulation of the sampled output signal, and transmit the sampled output signal to a receiving device as a single carrier modulated circularly pulse-shaped waveform.

In some embodiments, a method of generating a block of circularly pulse-shaped waveforms is disclosed. The method comprises receiving a string of data symbols with a processor of a transmitter, spreading the string of data symbols across a number of tones in the frequency domain with the processor, summing the tones with the processor, circularly shifting and accumulating a result of the summing with the processor, generating an output signal with the processor by serializing a result of the circularly shifting and accumulating, and transmitting the output signal wirelessly via communication elements of the transmitter to a receiving device.

In some embodiments, a receiving device is disclosed for processing a data signal exhibiting a single carrier modulation waveform. The receiving device comprises a receiver having a processor and communication elements. The receiver is configured to receive a data signal having single carrier modulated circularly pulse-shaped waveform, and generate estimates of data symbols $s_0$ through $s_{L-1}$ that are spread across a number of tones responsive to performing a reverse signal synthesis to the data signal via a fast Fourier transform (FFT) demodulator block of the receiver.

In some embodiments, a communication system comprises a transmitter and a receiver. The transmitter includes a processor and communication elements, and is configured to: generate an output signal exhibiting a circularly pulse-shaped waveform constructed by using a circular convolution for pulse shaping during synthesis of an input data signal; reduce peak-to-average-power-ratio (PAPR) of the output signal responsive to performing single carrier modulation of the input data signal using a pulse shaping filter in the frequency domain; and transmit the output signal as a single carrier modulated circularly pulse-shaped waveform. The receiver includes a processor and communication elements. The receiver is configured to receive the output signal from the transmitter; and generate estimates of data symbols $s_0$ through $s_{L-1}$ that are spread across a number of tones responsive to performing a reverse signal synthesis to the data signal via a fast Fourier transform (FFT) demodulator block of the receiver.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

FIG. 1 is a schematic diagram illustrating a structure of an OFDM data packet.

FIG. 2 is a schematic diagram illustrating a structure for a circularly pulse-shaped waveform for a packet generated by a transmitter.

DETAILED DESCRIPTION

Figure 3:
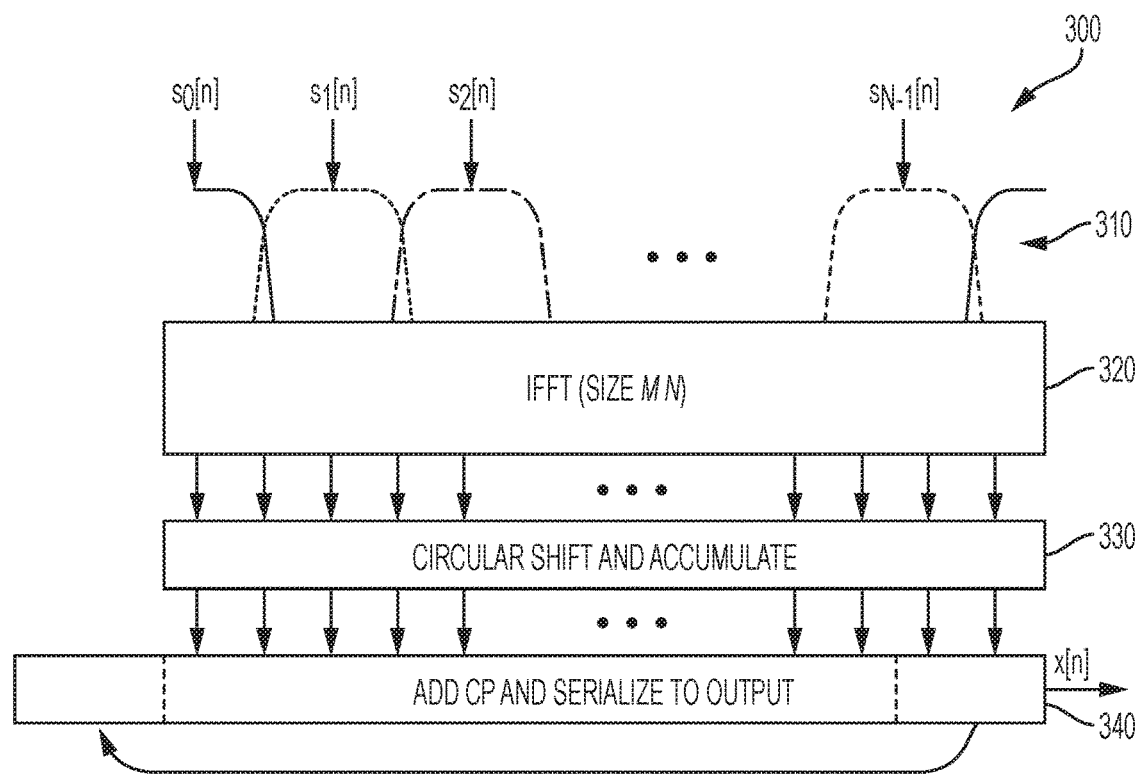
FIG. 3 is a schematic block diagram illustrating a method of constructing a GFDM waveform block.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Additional details of GFDM and C-FBMC can be found in different published works, such as for example, B. Farhang-Boroujeny and H. Moradi, "OFDM Inspired Waveforms for 5G," in *IEEE Communications Surveys & Tutorials*, vol. 18, no. 4, pp. 2474-2492, Fourth Quarter 2016; A. R. Reyhani, A. Farhang, and B. Farhang-Boroujeny "Circularly Pulse-Shaped Waveforms for 5G: Options and Comparisons," in *IEEE Xplore*, 25 Feb. 2016 (presented at Global Communications Conference (GLOBECOM), 6-10, Dec. 2015); and A. Aminjavaheri, A. Farhang, A. Reyhani, and B. Farhang-Boroujeny, "Impact of Timing and Frequency Offsets on Multicarrier Waveform Candidates for 5G," in *IEEE Xplore*, 4 Jan. 2016 (presented at Signal Processing and Signal Processing Education Workshop (SP/SPE), 9-12, Jan. 2016). The disclosure of each of these references is hereby incorporated herein in its entirety by this reference.

Embodiments of the disclosure include systems, devices, and methods for signaling methods including single carrier circularly pulse-shaped modulation. For example, embodiments of the present disclosure relate to methods and devices for generating circularly pulse-shaped waveforms for communication systems. Circularly pulse-shaped waveforms are a new class of multicarrier modulation methods that operate based on the same principle as the orthogonal frequency division multiplex (OFDM) and filter bank multicarrier (FBMC) modulations. In other words, circularly pulse-shaped waveforms attempt to keep the benefits of both OFDM and FBMC modulations. In embodiments of this disclosure, a single carrier modulation signal may be generated in which pulse-shaping is performed using a circular convolution. This new modulation may be viewed as an improvement over the DFT-spread-OFDM (DFT-s-OFDM)—also known as single carrier frequency division multiple access (SC-FDMA)—that has been adopted in the LTE uplink for reducing peak-to-average-power-ratio (PAPR). This new single carrier method results may be about the same gain (or greater) as the gain that DFT-s-OFDM has over conventional OFDM signaling methods. Moreover, embodiments of the disclosure include a MIMO friendly modulation technique.

Each of the transmitters and receivers described herein may include components such as one or more processors, communication elements (e.g., transceiver, antenna, etc.), memory, etc., configured to enable each device to perform the functions described herein. For example, the transmitter and/or receiver may be incorporated within an electronic device, such as a smart phone, electronic reader, tablet computer, laptop computer, desktop computer, television, various components of an automobile, wearable devices, household devices, router, wireless access point, among other contemplated devices. In some embodiments, some electronic devices may be configured as both a transmitter and a receiver. In other words, using the term "receiver" should not be interpreted to mean that a device may only operate as a receiver. Similarly, using the term "transmitter" should not be interpreted to mean that a device may only operate as a transmitter.

In some embodiments, the receiver and/or transmitter may be incorporated as a standalone integrated circuit mounted on the circuit board of the electronic device, in which the receiver and/or transmitter includes its own dedicated processor and/or memory specifically configured to execute and perform the methods described herein. In some embodiments, the receiver and/or transmitter may be incorporated (e.g., as firmware) within one or more processing elements that also perform other functions of the larger electronic device.

Headings are included herein to aid in locating certain sections of detailed description. These headings should not be considered to limit the scope of the concepts described under any specific heading. Furthermore, concepts described in any specific heading are generally applicable in other sections throughout the entire specification.

1. Derivation of Circularly Pulse-Shaped Waveforms Based on OFDM Principles

For assistance in obtaining understanding of some of the principles related to the embodiments of the present disclosure, a brief review of the principles based on which OFDM signaling works is discussed. Circularly pulse-shaped waveforms are then introduced and it is shown that these waveforms can be synthesized by following similar principles. This development also reveals that the application of the circularly pulse-shaped waveforms to MIMO channels may be as trivial as their OFDM counterpart.

1.1. The OFDM Principles

Each OFDM symbol carries N QAM symbols $s_k[n]$ (k=0, 1, ..., N-1), and is constructed as:

$$x_n(t) = \sum_{k=0}^{N-1} s_k[n] e^{j\frac{2k\pi}{T}t} \quad (1)$$

wherein:
- $x_n(t)$ is a summation of N tones, weighted by the data symbols $s_k[n]$;
- the tones are frequency spaced at F=1/T and are located at the frequencies f=0, 1/T, 2/T, ..., (N-1)/T;
- $x_n(t)$ is periodic with a period of T;
- the Fourier series coefficients of $x_n(t)$ are the data symbols $s_k[n]$ (k=0, 1, ..., N-1), and the construction of $x_n(t)$ may be viewed as an inverse Fourier series; and
- if $x_n(t)$ is passed through a channel with the transfer function H(f), the channel output, after passing through its transient, is obtained as:

$$y_n(t) = \sum_{k=0}^{N-1} H\left(\frac{k}{T}\right) s_k[n] e^{j\frac{2k\pi}{T}t} \quad (2)$$

wherein:
- $y_n(t)$ is also periodic with a period of T; and
- the Fourier series coefficients of $y_n(t)$ are $H(k/T)s_k[n]$ for k=0, 1, ..., N-1. Hence, the transmitted data symbols s[n] may be extracted from samples of $y_n(t)$ by applying a Fourier series analysis and equalizing the results by the inverse of channel gains at the respective frequencies.

In practice, where digital circuitry or a software radio is used for implementation, the signal synthesis equation (1) may be implemented through an inverse discrete Fourier transform or equivalently and conveniently, through an inverse fast Fourier transform (IFFT). The IFFT output may deliver only one cycle of the sampled version of $x_n(t)$ (e.g., $x_n[m]$, for m=0, 1, . . . , N−1). Similarly, the data extraction at the receiver is performed by applying an FFT to the samples of a single period of y(t) (e.g., y[m] for m=0, 1, . . . , N−1) and equalizing the results by multiplying to the inverse of the channel gains.

It may be resource inefficient to transmit $x_n(t)$ for any period of time beyond the minimum duration that one needs for correct extraction of the data symbols $s_k[n]$ at the receiver. This minimum duration is T (i.e., one period of (t)) plus the duration of the channel impulse response $T_{ch}$. The latter may be needed to absorb the channel transient response. To serve this purpose, in digital implementation of an OFDM transmitter, a number of samples, equivalent to $T_{cp} \geq T_{ch}$, from the end of the IFFT output are prefixed to its beginning. The prefixed samples are called "cyclic prefix" (CP). At the receiver, the FFT is applied after removing the CP samples.

Figures 1, 2:
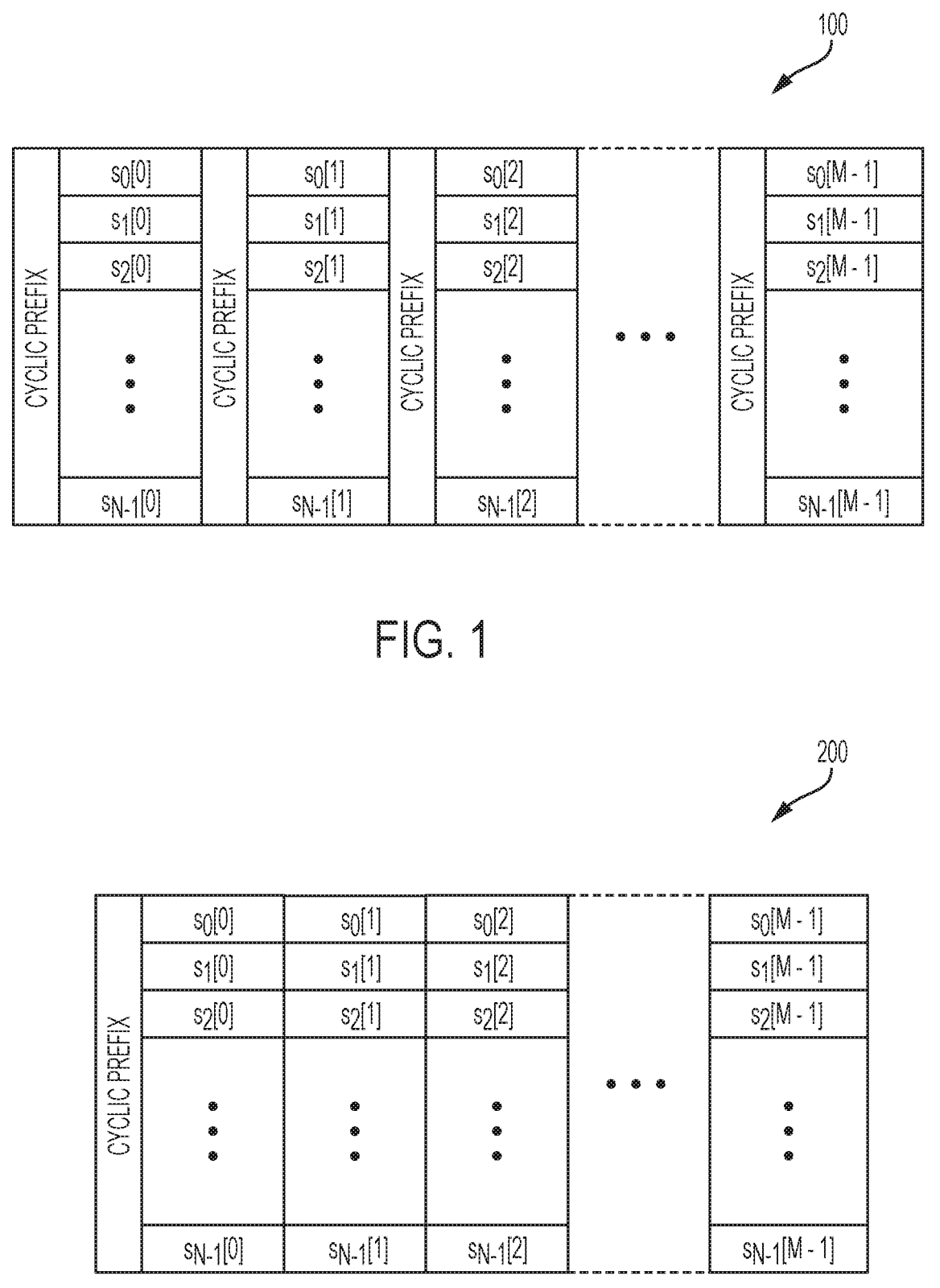

FIG. 1 is a schematic diagram illustrating a structure of an OFDM data packet 100. Each column of data symbols (e.g., [n] for k=0, 1, . . . , N−1) are packaged together through an IFFT and the result is cyclic prefixed to generate the corresponding OFDM symbols for each respective column. These OFDM symbols are concatenated to generate the OFDM data packet 100 having M blocks (e.g., n=0, 1, . . . , M−1) of OFDM symbols that are N plus the length of CP samples long.

1.2. Circularly Pulse-Shaped Waveforms (GFDM and C-FBMC): Transmitter

FIG. 2 is a schematic diagram illustrating a structure 200 for a circularly pulse-shaped waveform for a packet generated by a transmitter. This structure 200 may be a single data packet or a data block within a longer data packet. In a circularly pulse-shaped waveform, the data set in all columns of FIG. 1 (excluding CPs) may be brought together (as shown in FIG. 2) and jointly processed to generate a single period of a periodic signal with period of MN samples. To relate this process to that of OFDM (see, e.g., FIG. 1), it is noted that in OFDM each column of N data symbols is processed through an IFFT to generate a periodic signal with a period of N samples. Accordingly, the generated periodic signal could be represented by a summation of N complex-valued sinusoidal tones. The circularly pulse-shaped waveform for the structure 200 of FIG. 2 may be represented by a summation of MN complex-valued sinusoidal tones. Moreover, a single CP may be sufficient to serve a block of MN data symbols for a circularly pulse-shaped waveform.

The construction of a circularly pulse-shaped waveform may include the following steps. Each row of the data matrix (e.g., [0], [1], . . . $s_k[M-1]$) may be passed through a band-pass filter centered at the respective subcarrier band. Also, to generate a signal that is one period of a periodic signal, the convolution for filtering may be performed through a circular convolution. In some embodiments, a period may include MN samples. Each band-pass filter may include an impulse response obtained as a weighted sum of a number of tones. An example of a filter design procedure for construction of such filter is described in K. Martin, "Small side-lobe filter design for multitone data-communication applications," *IEEE Transactions on Circuits and Systems II: Analog and Digital Signal Processing*, vol. 45, no. 8, pp. 1155-1161, 1998, and S. Mirabbasi and K. Martin, "Overlapped complex-modulated transmultiplexer filters with simplified design and superior stopbands," *IEEE Transactions on Circuits and Systems II: Analog and Digital Signal Processing*, vol. 50, no. 8, pp. 456-469, 2003, the entire disclosure of each which is incorporated herein by this reference. Other filter designs are also contemplated.

FIG. 3 is a schematic block diagram 300 illustrating a method of constructing a GFDM waveform block. At operation 310, a string of data symbol (e.g., $s_0[n]$, $s_0[n]$, . . . $s_{N-1}[n]$) may spread across a number of tones. In some embodiments, spreading the string of data symbols across the number of tones may be weighted according to a filter design approach. At operation 320, these tones may be summed together (e.g., using an IFFT of size MN). At operation 330, the result of the summation may be circularly shifted and accumulated to account for the successive data columns in the GFDM data structure. At operation 340, a CP may be added to the final result and the output may be serialized. As a result, the GFDM waveform/signal block may then be ready for transmission as output signal x[n]. The transmitting device may then transmit the output signal x[n] to the receiving device for demodulation. The construction of a C-FBMC waveform may also follow a similar procedure as the GFDM waveform. The difference between a GFDM waveform and the C-FBMC waveform may be that in C-FBMC the real and imaginary parts of each QAM symbol have a time offset of T/2 (equivalent to N/2 samples) with respect to one another.

1.3. Circularly Pulse-Shaped Waveforms (GFDM and C-FBMC): Receiver

As in OFDM, a channel introduces amplitude scaling to each of signal tones in a circularly pulse-shaped signal block. Accordingly, at the receiver, after removing CP and applying an IFFT to the received signal, the impact of the channel on the signal tones may be reduced (e.g., removed) by applying a signal-tap equalizer per tone. The tones that correspond to each subcarrier band are then placed at the baseband and converted to time domain to extract the transmitted data symbols.

1.4. C-FBMC Versus GFDM

GFDM uses a conventional QAM modulation scheme to transmit data symbols over each subcarrier band. To keep the bandwidth efficiency of the transmission at its maximum, adjacent subcarrier bands are allowed to overlap, which may lead to a non-orthogonal waveform (i.e., the basis functions that synthesize the waveform are a set of non-orthogonal functions). As a result, data detection involves a successive interference cancellation (SIC) process that increases the complexity of the receiver considerably and leads to some performance loss.

A C-FBMC waveform, on the other hand, may be constructed based on a set of basis functions that are orthogonal in the real domain. This is because the QAM data symbols are replaced by offset QAM (OQAM) data symbols, which may facilitate the receiver processing and reduce a loss of performance when compared to OFDM. Thus, C-FBMC may offer a simpler receiver structure than GFDM because the need for an SIC may be eliminated.

Figure 4:
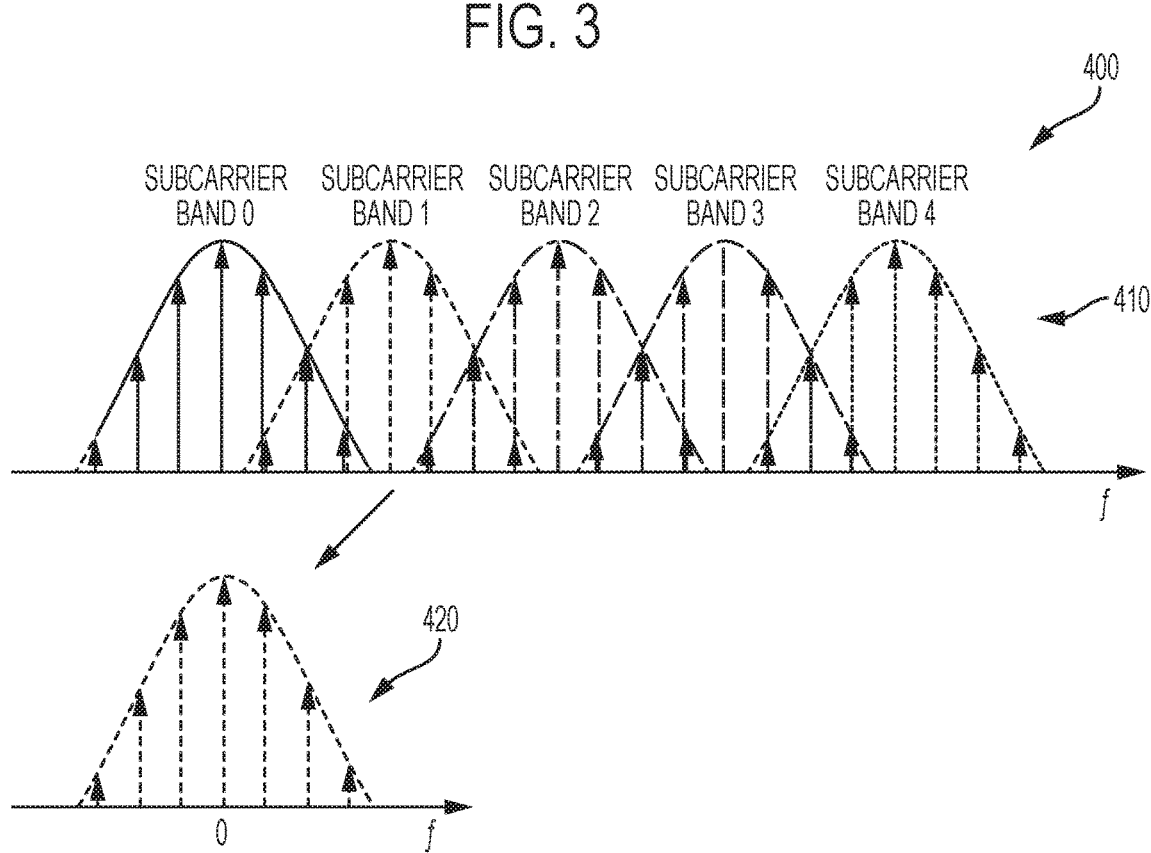
FIG. 4 illustrates a circularly pulse-shaped waveform in terms of its component tones for different subcarrier bands.

FIG. 4 illustrates a circularly pulse-shaped waveform 400 in terms of its component tones for different subcarrier bands (e.g., subcarrier band 0, subcarrier band 1, subcarrier band 2, subcarrier band 3, subcarrier band 4) as shown in the top part 410 of FIG. 4. At the receiver, for demodulation and data extraction at each subcarrier band, each set of tones may be shifted to the baseband for subsequent processing as shown in the bottom part 420 of FIG. 4. Interference from the adjacent subcarrier bands is ignored in FIG. 4 for the sake of simplicity; however, it is recognized that such interference may be present.

2. Out-of-Band Emissions in Circularly Pulse-Shaped Waveforms

GFDM and C-FBMC waveforms are made up of a summation of complex-valued sine-waves, and suffer from the same out-of-band (OOB) emissions as OFDM. Also, similar to OFDM, a variety of widowing and filtering techniques may be applied to improve on the OOB emissions of GFDM and C-FBMC waveforms. Over the years, many attempts have been made to control the OOB emissions of OFDM. Windowed OFDM (also known as window overlap and add OFDM (WOLA-OFDM)) and filtered OFDM (f-OFDM) are the more popular methods that have been discussed in the literature and been adopted by the industry standards. Both methods can be categorized as filtering operations. While WOLA-OFDM applies its filtering operation on a per subcarrier basis, f-OFDM filtering is applied to a cluster of subcarriers corresponding to a resource block in LTE. While WOLA-OFDM has been adopted in DSL technologies and in IEEE 802.11 standards, f-OFDM has been selected for IEEE 802.16 standards as well as LTE and LTE-advanced.

WOLA filtering as well as cluster filtering of OFDM are trivially extendable to GFDM and C-FBMC. Applying WOLA filtering to GFDM and C-FBMC may shape each of the frequency tones that synthesize these waveforms separately. Cluster filtering may also be applied to a cluster of subcarrier bands, as in f-OFDM. Another cluster filtering method is universal filtered OFDM (UF-OFDM) (also referred to as "universal filtered multicarrier" (UFMC)). In UF-OFDM, the CP part of the conventional OFDM signal is replaced by a set of zero samples and the CP period is used to take care of the transients of the filter. As a result, a longer length filter may be used in comparison to the filters used in f-OFDM, which may result in a better suppression of the OOB emissions. This method may also be extended to GFDM and C-FBMC.

Design of multicarrier waveforms (e.g., OFDM, circularly pulse-shaped waveforms, etc.) may employ a filter with a transition band to reduce OOB emissions. As a result, different segments of the spectral band that are used by different users may have to be separated by guard bands. Reducing PAPR in generating a single carrier modulation signal may be achieved by taking advantage of such guard bands as will be discussed below.

3. CFO Compensation in Multi-user Networks

In the uplink of a multi-user network, each user may be allocated a set of subcarrier bands for transmission of each user's signal. However, when it comes to the signal processing and data extraction at the receiver, the spectra for the user's signal may experience some frequency shift from the transmitted frequency. The amount of the frequency shift may be equal to the difference between each user carrier frequency and the carrier frequency used by the base station for demodulation as well as any additional frequency offset that may have been introduced by a Doppler shift.

Figure 5:
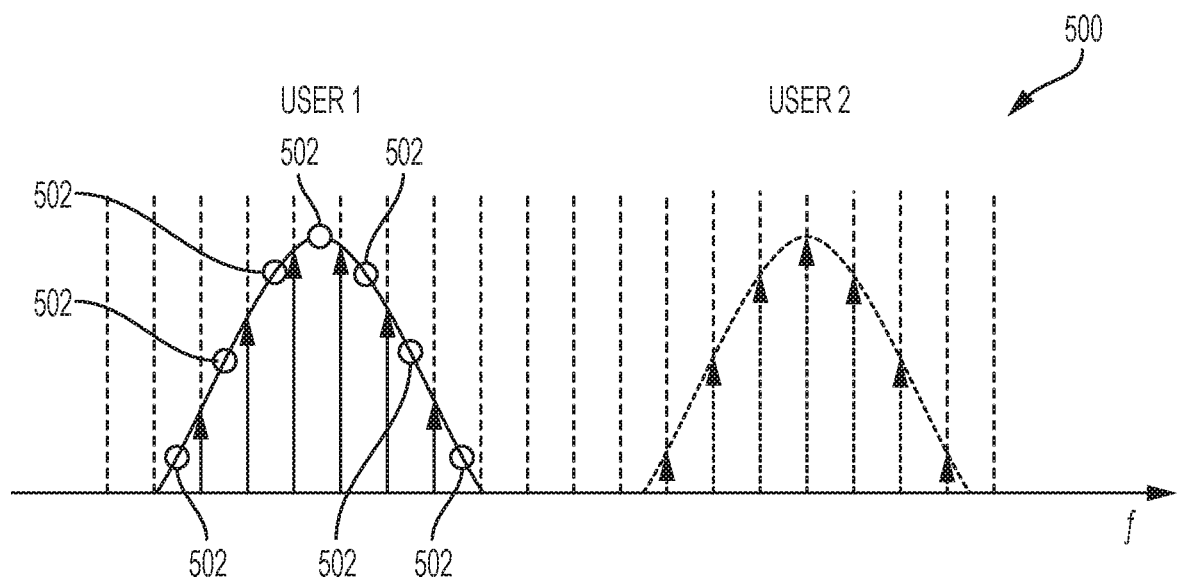
FIG. 5 is a frequency domain plot illustrating the signal spectra with possible CFOs for two different users of a multi-user network according to an embodiment of the present disclosure.

FIG. 5 is a frequency domain plot 500 illustrating the signal spectra with possible carrier frequency offset (CFO) for two different users of a multi-user network according to an embodiment of the present disclosure. The spectral sample magnitudes after the FFT operation are shown by the vertical arrows. The grid lines show the locations of the spectral samples at the receiver after the FFT operation. As shown in FIG. 5, the signal associated with user 1 may experience some CFO (illustrated by the spectral samples not being aligned with the center of the spectrum), and the signal associated with user 2 may not experience CFO (illustrated by the spectral samples being aligned with the center of the spectrum). Thus, data symbols from the signal of user 2 may be extracted by following the procedure mentioned in the previous section and presented in FIG. 4. However, for the signal of user 1, an interpolation operation may be applied among the present spectral samples to obtain the samples (represented by circles 502) before data extraction occurs. Alternatively, one may note that a shift in the frequency domain samples may be compensated for by demodulating the extracted data symbols with a complex sine-wave whose frequency is equal to that of the respective CFO.

It is noted that the above spectral interpolation (i.e., to compensate for CFO compensation) may only be possible for the circularly pulse-shaped waveforms and not for OFDM because signal spectra are sampled faster for circularly pulse-shaped waveforms than their OFDM counterparts. In other words, although there may be sufficient samples for interpolation in circularly pulse-shaped waveforms, the available spectral samples in OFDM are insufficient for interpolation. Because of this limitation, in the uplink of OFDM systems, CFO compensation has to be performed for each user signal separately before applying the FFT demodulator. This in turn implies that CFO compensation in OFDM may be significantly more complex than in the circularly pulse-shaped waveform.

4. Reducing PAPR Through Single Carrier Modulation

In the uplink of LTE and LTE-advanced to reduce peak-to-average power ratio of the transmit signals the data symbols before being passed to the IFFT (modulator) block are precoded by a DFT matrix. This method is often referred to as DFT spread OFDM (DFT-s-OFDM) and may be equivalent to serializing a set of data symbols, that otherwise would be transmitted over multiple subcarriers in parallel. As a result, the data symbols may be transmitted through a single carrier channel. The method may be applied to circularly shaped waveforms as follows. This extension to circularly shaped waveforms brings with itself a number of advantages over the DFT-s-OFDM. For example, lower sensitivity to the CFO and more flexibility in reducing PAPR may be achieved. The PAPR reduction may be on the order of a few decibels. It also allows adoption of both QAM and OQAM modulation. DFT-s-OFDM has only been used to transmit QAM symbols. The use of OQAM has the benefit of further reducing PAPR by about 1 dB over QAM. Moreover, adoption of OQAM allows overlapping of adjacent resource blocks, if they can be guaranteed to be synchronized; for instance when they are transmitted by a single user.

4.1. Transmitter Signal Processing

Figure 6:
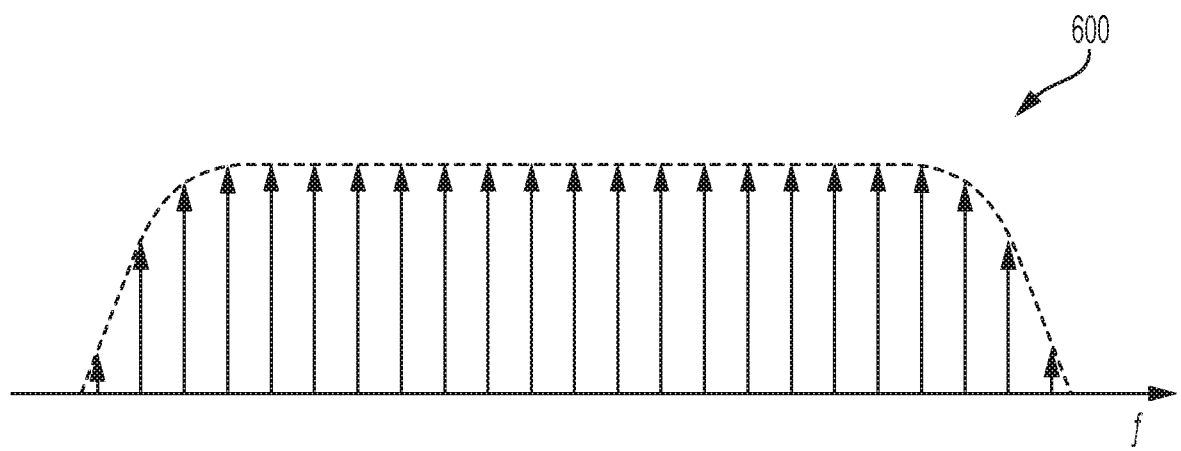
FIG. 6 shows a frequency domain plot for a transmitted signal having a spectrum represented by a set of spectral lines/tones for the generated single carrier circularly pulse-shaped signal.

A transmitter may be configured to generate a data signal having a single carrier circularly pulse-shaped waveform through a modification of the case presented in FIG. 4. In FIG. 4, there are five subcarrier bands illustrated, each subcarrier band carrying a sequence of data symbols at a rate equal to the bandwidth B of each subcarrier. Also, each subcarrier pulse-shape of FIG. 4 is that of a square-root Nyquist filter. The five subcarrier bands in FIG. 4 may be combined to a single broad band through which data symbols are transmitted. FIG. 6 shows a frequency domain plot 600 for a transmitted signal having a spectrum represented by a set of spectral lines/tones for the generated single carrier circularly pulse-shaped signal.

The process of generating a single carrier pulse-shaped signal for transmitting a sequence of data symbols is discussed next. The cases of QAM and OQAM data symbols are presented separately.

For the case of QAM symbols, the transmission of a column vector of the QAM data symbols is represented as:

$$s = \begin{bmatrix} s_0 \\ s_1 \\ \vdots \\ s_{L-1} \end{bmatrix}. \quad (3)$$

The desired single carrier signal is obtained by expanding the vector s to a length equal to that of the prototype filter h (which should be equal to the length of the signal to be generated) and circularly convolving the result with prototype filter h. The expanded version of vector s, denoted by $s_e$, is obtained by inserting ((N/L)−1) zeros after each element of vector s. Here, N denotes the length of prototype filter h, and it is assumed that (N/L) is an integer. If the vector x is used to denote the desired single carrier signal and K=(N/L), then:

$$x = H s_e \quad (4)$$

where H is an N×N circular matrix with the first column of prototype filter h. Because H is a circular matrix, it can be expanded as:

$$H = F^{-1} \text{diag}(h_f) F \quad (5)$$

where F is the normalized (i.e., $FF^{-1}=I$, where I is the identity matrix) DFT matrix and $h_f$ is the DFT of prototype filter h.

Replacing equation (5) in equation (4) and multiplying the resulting equation from left by F results in:

$$x_f = \text{diag}(h_f) F s_e \quad (6)$$

where $x_f$ is the DFT of vector x.

Noting that $s_e$ is an expanded version of vector s, computation of $Fs_e$ can be performed by first evaluating the DFT of the vector s, a vector that is K times shorter than $s_e$, and then repeating the result K times. This reduces the complexity of the DFT operation for $Fs_e$ by a factor equal to $K\log_2 K$, assuming that K is an integer power of 2.

The frequency domain pulse shaping filter $h_f$ may enable many degrees of freedom in its selection for minimizing the PAPR of the transmit signal x. With such flexibility, many different designs are contemplated. In addition, any shape that may be chosen for frequency domain pulse shaping filter $h_f$ to minimize PAPR, may be accounted as part of the channel and may be compensated for at the receiver, as part of the channel equalization step. Channel equalization for the proposed single carrier signaling may be best handled in the frequency domain. The detail of the frequency domain equalization is discussed below as part of the receiver structure.

Figure 7:
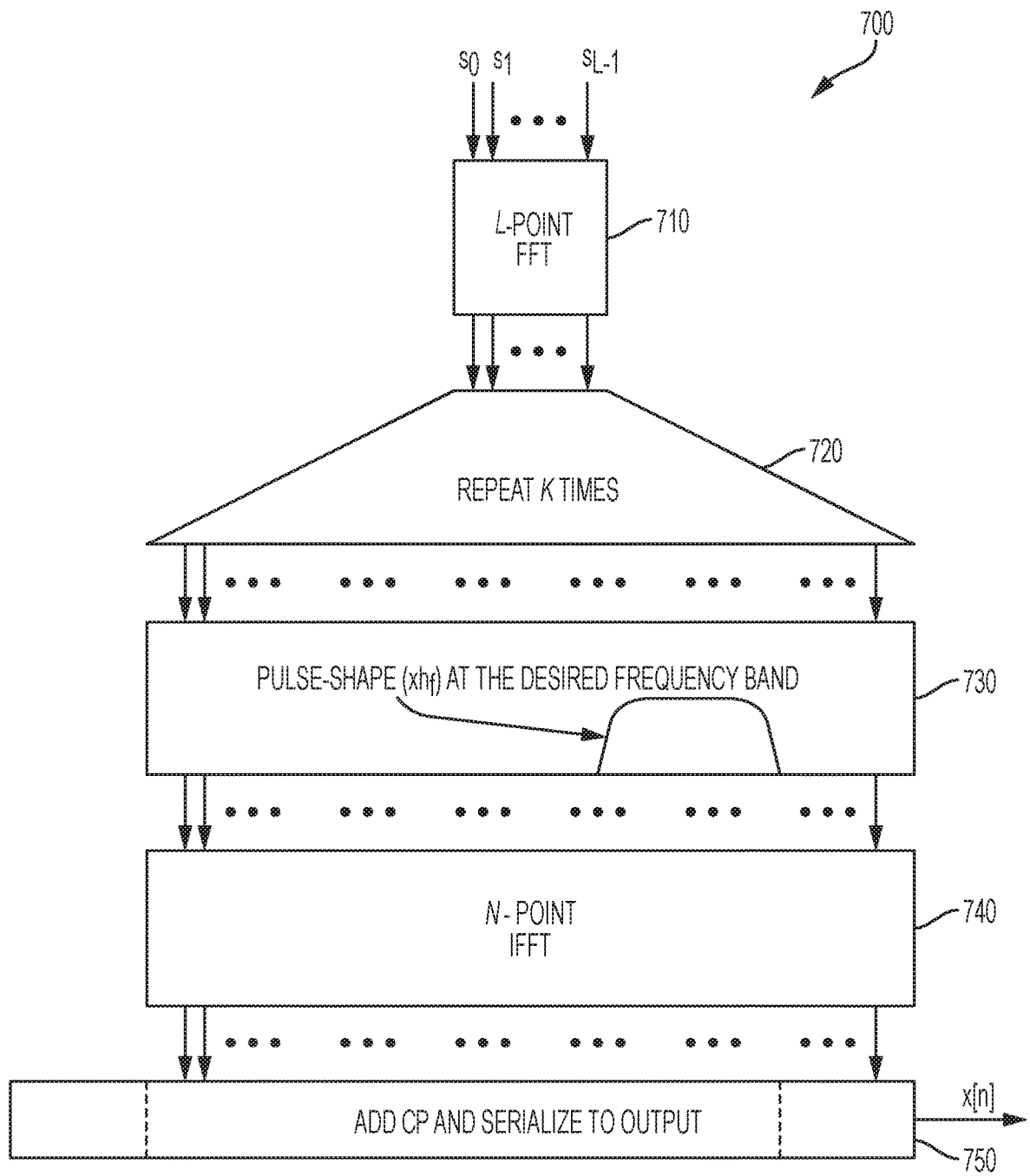
FIG. 7 is a flow chart representing a method implemented by a transmitter configured to generate a single carrier circularly pulse-shaped waveform for the case where data symbols are QAM modulated.

FIG. 7 is a flow chart 700 representing a method implemented by a transmitter configured to generate a single carrier circularly pulse-shaped waveform for the case where data symbols are QAM modulated.

At operation 710, an L-point FFT operation may be applied to the data symbols to convert the data vector s (e.g., sequence of data symbols $s_0$, $s_1$, ... $s_{L-1}$) into the frequency domain. In particular, the L-point FFT operation may be repeated K times (operation 720) to generate the vector $Fs_e$ in the frequency domain having length N. At operation 730, the vector $Fs_e$ may be shaped by the pulse-shaping filter $h_f$ (in the frequency domain) at a frequency band of interest. Operation 730 may perform pulse-shaping and modulation of the single carrier signal to a specific band of a broad bandwidth that may be shared among a number of users. Each user takes a portion of the broad band. The shape of the pulse-shaping filter $h_f$ may contribute to the reduction of PAPR in the single carrier signal. A non-limiting method for determining a shape of the pulse-shaping filter $h_f$ is described below in Section 4.4. At operation 740, an N-point IFFT block converts the result to the time domain. Subsequently, at operation 750, a CP is added to the result of the IFFT block and is serialized to generate the output signal x[n] that is transmitted to the receiver. Moreover, in some embodiments the output signal x[n] may be filtered or a WOLA process may be applied to reduce its OOB emissions. Alternatively, the CP may be replaced by padded zeros prior to filtering.

For the case of OQAM symbols, the real and imaginary parts of each QAM data symbol are separated prior to operation 710 and the data vectors s is rearranged as:

$$s = \begin{bmatrix} s_{0,R} \\ js_{0,I} \\ s_{1,R} \\ js_{1,I} \\ \vdots \\ s_{L-1,R} \\ js_{L-1,I} \end{bmatrix} \quad (7)$$

where the subscripts "R" and "I" refer to the real and imaginary parts of the respective data symbols and $j=\sqrt{(-1)}$.

Figure 8:
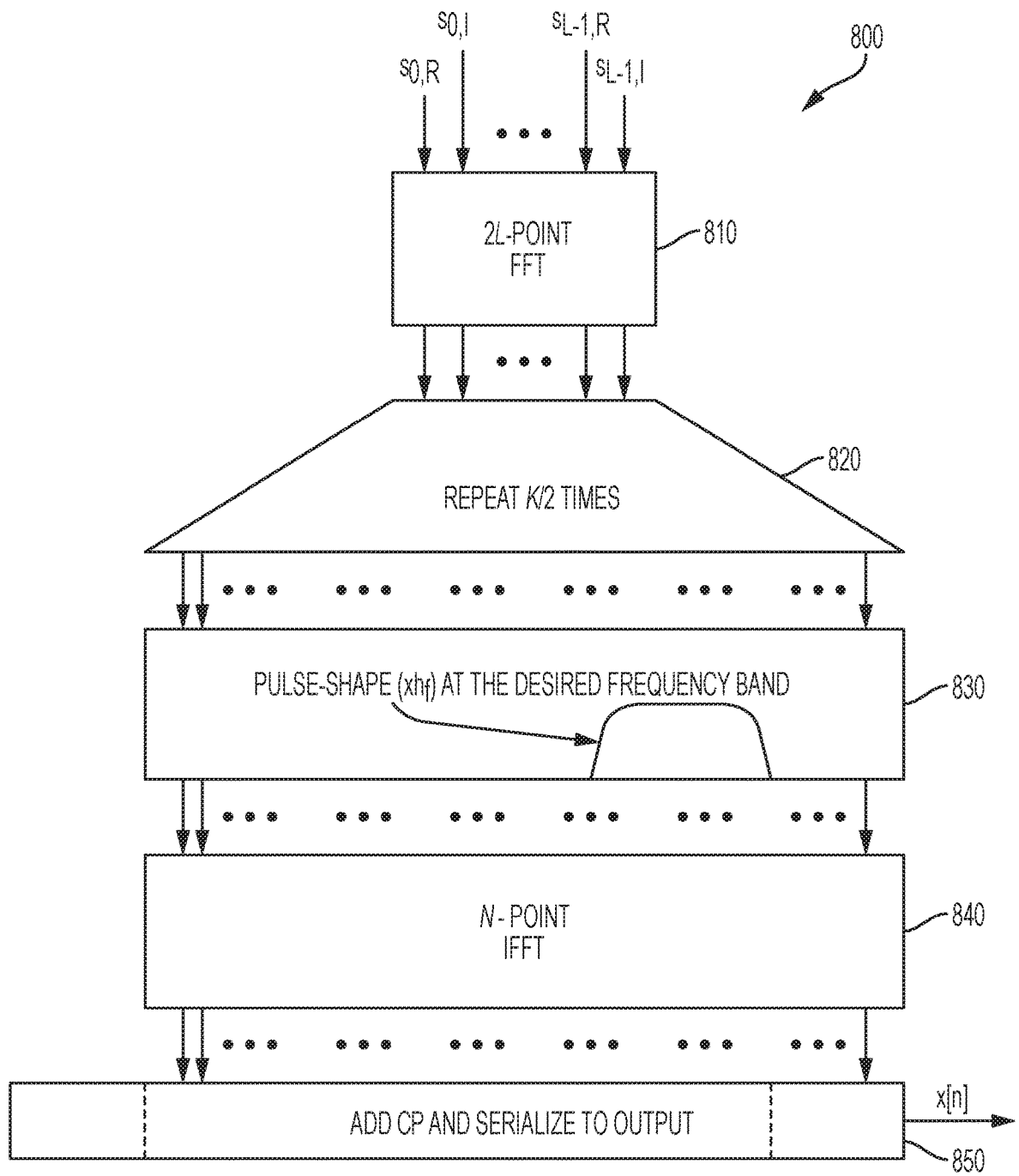
FIG. 8 is a flow chart representing a method implemented by a transmitter configured to generate a single carrier circularly pulse-shaped waveform for the case where data symbols are OQAM modulated.

FIG. 8 is a flow chart 800 representing a method implemented by a transmitter configured to generate a single carrier circularly pulse-shaped waveform for the case where data symbols are OQAM modulated. Operations 810 and 820 are similar to operations 710 and 720 of FIG. 7, respectively, except that the vector s will be the input to a DFT of size 2L (operation 810) and the subsequent step repeats the result K/2 times (operation 820). The rest of operations 830, 840, and 850 may be substantially similar to operations 730, 740, and 750 described above for the QAM case.

Figure 9:
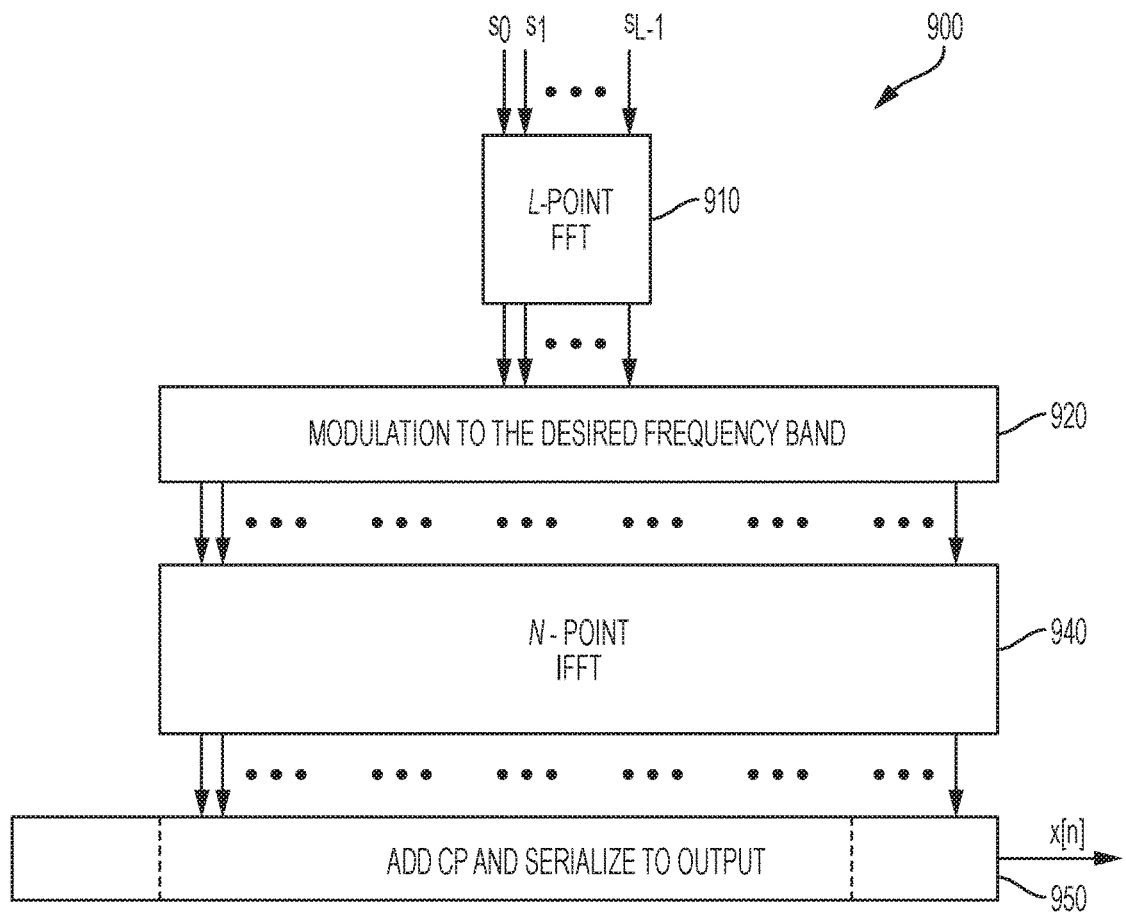
FIG. 9 is a flow chart representing a method implemented by a transmitter configured to generate a single carrier circularly pulse-shaped waveform for the case where data symbols are DFT-s-OFDM modulated.

FIG. 9 is a flow chart 900 representing a method implemented by a transmitter configured to generate a single carrier circularly pulse-shaped waveform for the case where data symbols are DFT-s-OFDM modulated. This implies that the single carrier modulator that this disclosure may be an advancement over DFT-s-OFDM in which the frequency domain pulse-shaping stage, implemented through the second and third blocks from the top in FIGS. 7 and 8 have been added. In other words, the DFT-s-OFDM has a structure that is similar to FIG. 7, with the operations 720, 730 of FIG. 7 being replaced by operation 920 that shifts the output of the DFT to a specific frequency band at the IFFT input. This addition may add a great level of flexibility that enables the PAPR to be reduced on the order of a few decibels. Operations 910, 940, and 950 may be substantially similar to operations 710, 740, and 750 described above for the QAM case.

4.2. Receiver Signal Processing

Assuming that the proposed single carrier signal makes use of a CP, after passing through the channel, the FFT of the CP-stripped received signal is related to $x_f$ according the following equation:

$$y_f = C x_f + v_f \quad (8)$$

where C is a diagonal matrix with the channel gains at different tones that $x_f$ was synthesized based on at its diagonal elements, and $v_f$ originates from the channel noise. Data recovery at the receiver may be performed by taking the following steps:

1. An estimate of $x_f$ is calculated as:

$$\hat{x}_f = C^{-1} y_f \quad (9)$$

2. The estimate is then processed by taking the reverse of the signal synthesis that was discussed above to obtain the estimates of the data symbols $s_0$ through $s_{L-1}$.

4.3. Adaptation to MIMO Channels

In a MIMO channel, multiple data vectors (e.g., vector x) may be transmitted through different antennas and their combinations are received at multiple antennas at the receiver. Similar to the case of OFDM, at the receiver, for each subcarrier a vector of the received signal may be equal to its counterpart at the transmitter pre-multiplied by the channel gain matrix. The channel gain matrix may be removed through a zero forcing or MMSE equalizer and subsequent signal processing steps will follow. As a result, the single carrier modulation that was described herein may also be amenable to MIMO channels substantially similar to the applicable method for DFT-s-OFDM discussed above.

4.4. Prototype Filter Design

Different methods can be adopted to optimize the prototype filter h, with the goal of minimizing the PAPR. A non-limiting example of such a method is described herein that is directed towards CPS-OQAM; however, it is contemplated that similar design techniques can be adopted for CPS-QAM or other modulation techniques as would be apparent to a person of ordinary skill in the art.

Figure 10:
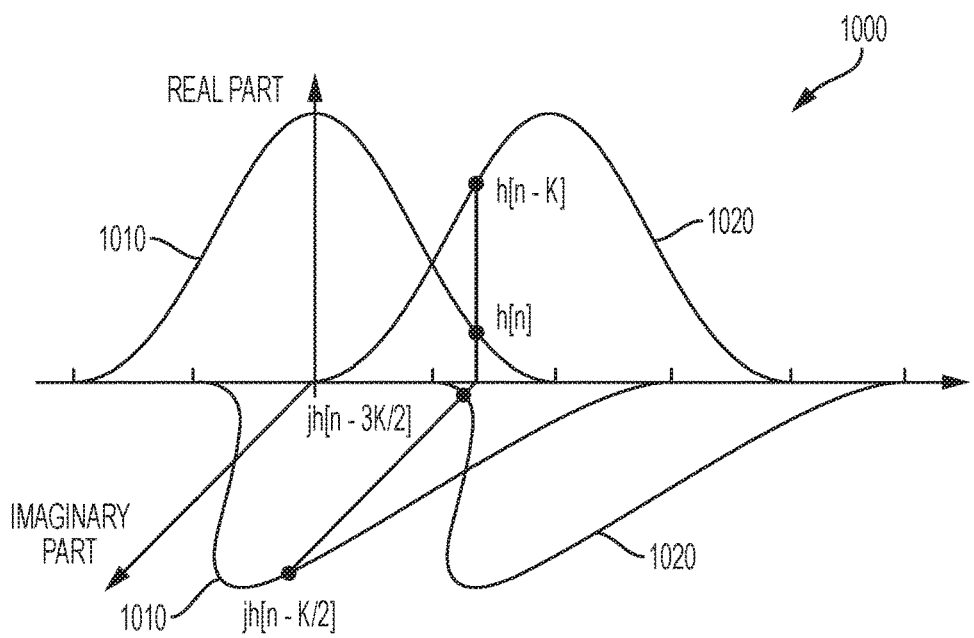
FIG. 10 presents a set of plots showing the impact of the prototype filter on the peak of a synthesized CPS-OQAM signal.

FIG. 10 presents a set of plots 1000 showing the impact of the prototype filter h[n] on the peak of a synthesized CPS-OQAM signal according to an embodiment of the disclosure. The prototype filter h[n] is signified by a sequence of pulses 1010, 1020. Each pulse 1010, 1020 is the carrier of the real or imaginary parts an OQAM symbol (e.g., $s_{k,R}$ or $s_{k,I}$). Accordingly, there are two sets of pulses that correspond to the real and imaginary parts of the synthesized signal. Moreover, it is assumed that the prototype filter h[n] is time-limited such that only adjacent OQAM symbols overlap; however, it is recognized that this simplification may be somewhat inaccurate in actual implementation. Within the context of FIG. 10, when the real and imaginary parts of the OQAM data sequence are binary, the maximum signal power at time index n is expressed as:

$$\zeta[n] = (|h[n]| + |h[n-K]|)^2 + \left(\left|h\left[n-\frac{K}{2}\right]\right| + \left|h\left[n-\frac{3K}{2}\right]\right|\right)^2. \quad (10)$$

With this definition of the peak power of the synthesized SPC-OQAM, the design setup may be implemented follows:

The power induced by real or imaginary part of each OQAM symbol may be normalized to unity by introducing the following constraint:

$$\frac{2}{K} \sum_n |h[n]|^2 = 1. \quad (11)$$

It is assumed that the prototype filter h[n] is zero-phase, which leads to the following constraint:

$$h[n] = h[-n] \quad (12)$$

This assumption also implies that:

$$h[n] = \frac{1}{N}\left(h_f[0] + 2\sum_{k=1}^{L_1} h_f[k]\cos\left(\frac{2\pi}{N}kn\right)\right) \quad (13)$$

where $L_1 = (1+\alpha)L/2$ and $\alpha$ is the filter roll-off factor. Because of equation (12), in equation (13) the frequency domain samples $h_f[0]$ through $h_f[L_1]$ are real-valued. Moreover, because the prototype filter h[n] is a band-limited filter, $L_1 \ll N$ for most designs of interest. As a result, an unknown prototype filter parameter in the frequency domain, $h_f[k]$, may be much smaller than the number of the time domain coefficients h[n]. Therefore, the design for the prototype filter may be improved by searching for the best choice of the frequency domain samples $h_f[0]$ through $h_f[L_1]$, while equation (13) is replaced in the time domain constraints such as equation (11).

The following constraints may also be imposed to assure minimal noise enhancement at the receiver when signal equalization is performed.

$$1-\epsilon_1 \leq h_f[k] \leq 1+\epsilon_1, \text{for } 0 \leq k \leq L_1 \quad (14)$$

wherein $\epsilon_1$ is a design parameter that is usually a small value.

In the defined cost function $\zeta[n]$ in equation (10), it was assumed that the prototype filter h[n] is negligible out of the range $-K \leq n \leq K$. To make sure this condition is satisfied within a good approximation, the following constraint may also be added to the design setup.

$$\sum_{|n|>K} |h[n]|^2 < \epsilon_2 \quad (15)$$

wherein $\epsilon_2$ is another design parameter that is also usually given a small value.

With the above setup, the design of the prototype filter h[n] may be carried out by performing the following min-max operation:

$$h[n] = \underset{h_f[k]}{\arg\min} \max_n \zeta[n],$$

subject to the constraints (11), (14), and (15).

This operation may be performed over the frequency domain variables $h_f[0]$ through $h_f[L_1]$, while it is noted that these variables relate to the time domain filter coefficients h[n] according to equation (13).

4.5. Numerical Results

In this section, numerical results may be used to compare the PAPR quality of OFDM with those of DFT-s-OFDM and single carrier circularly pulse-shaped waveforms. For the case of single carrier circularly pulse-shaped waveforms both QAM and OQAM symbols are examined. Cumulative complementary distribution functions (CCDF) may be employed to measure the PAPR quality of the examined waveforms. CCDF is a probability function and is defined as the probability of PAPR being greater than the value specified on the horizontal axis.

Figure 11:
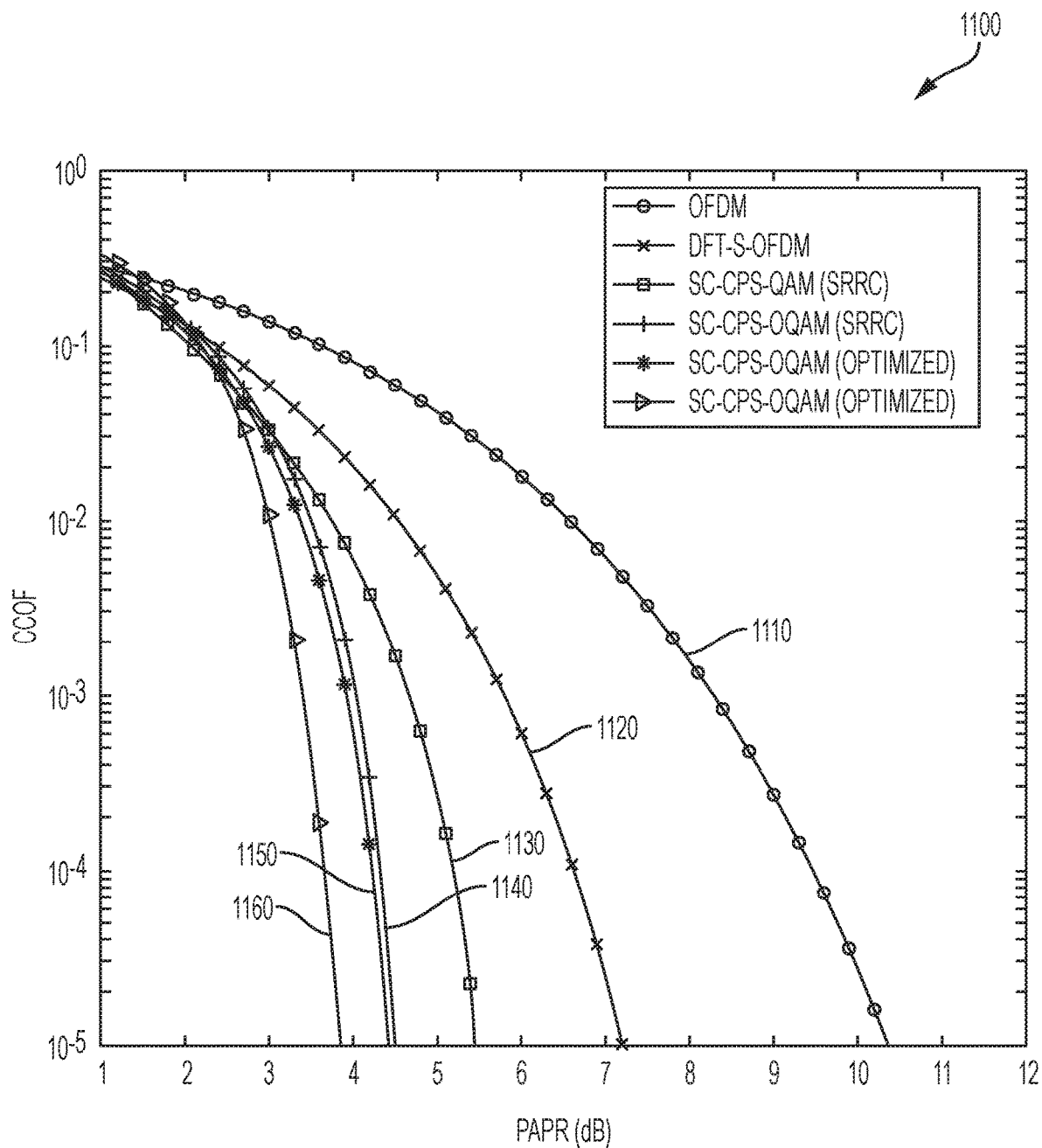
FIG. 11 is a graph illustrating set of CCDF curves for OFDM, DFT-s-OFDM, and different single carrier circularly pulse-shaped (SC-CPS) waveforms.
Figure 12:
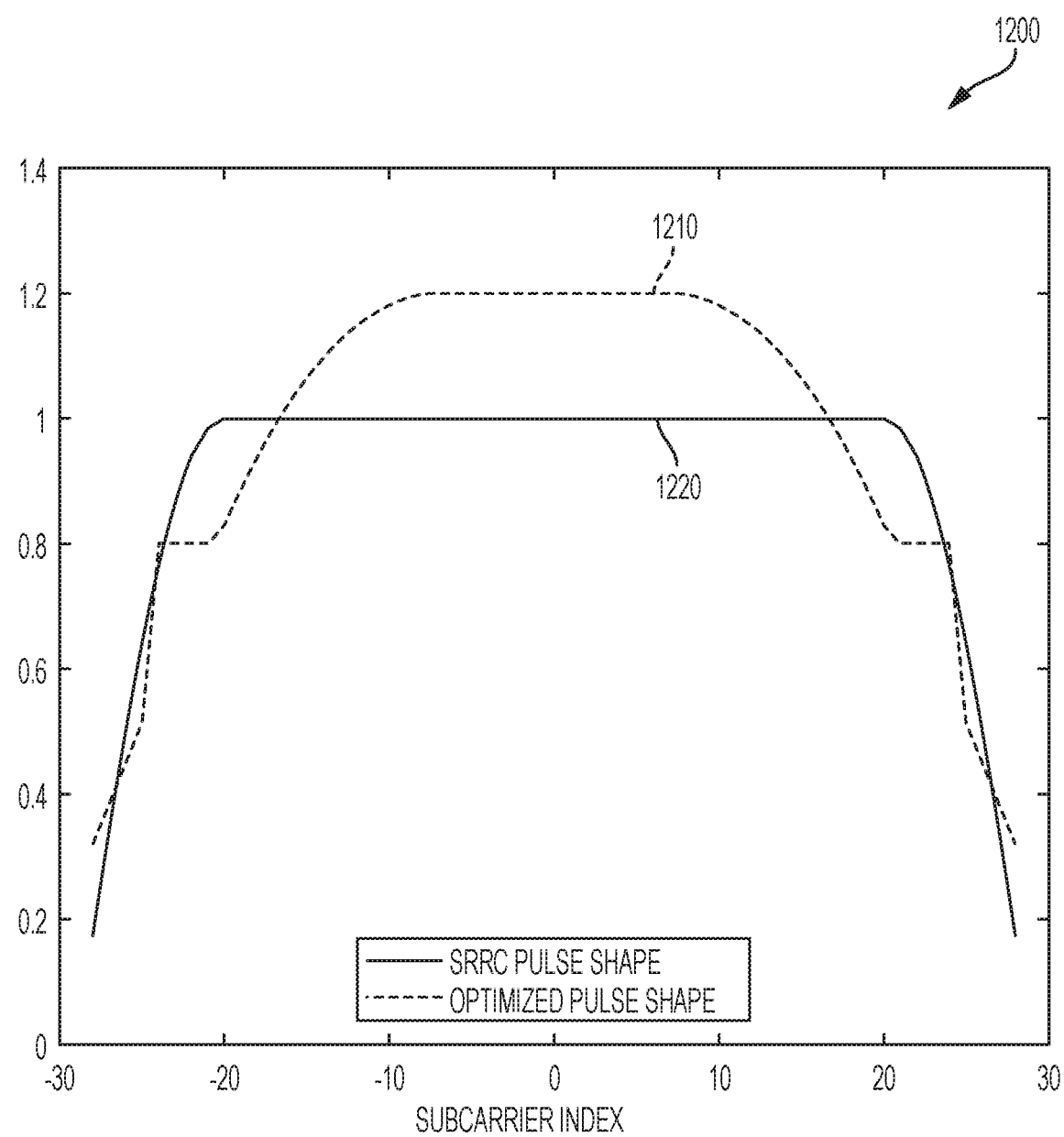
FIG. 12 is a plot showing examples of the pulse-shaping filter for different cases of the embodiments described herein.

FIG. 11 is a graph 1100 illustrating a set of CCDF curves for OFDM, DFT-s-OFDM, and different single carrier circularly pulse-shaped (SC-CPS) waveforms. The results for the SC-SPC waveforms are given for two cases. (i) When the pulse-shaping filter is simply chosen to be a square-root raised-cosine (SRRC); and (ii) When the pulse-shaping filter is optimized according to the design procedure that was presented in the previous section. In this example, the FFT length in OFDM is 1024 and the number of active subcarriers is equal to 48 (equivalent to 4 resource blocks). This implies the size of DFT (in L) for the DFT-s-OFDM is equal to 48. The same DFT size is also used for the single carrier circularly pulse-shaped waveforms when QAM symbols are transmitted. The roll-off factor α=0.15 is used for both the SRRC and optimized designs. Line 1110 is a CCDF curve for OFDM, line 1120 is a CCDF curve for DFT-s-OFDM, line 1130 is a CCDF curve for SC-CPS-QAM (SRRC), line 1140 is a CCDF curve for SC-CPS-OQAM (SRRC), line 1150 is a CCDF curve for SC-CPS-QAM (optimized), and line 1160 is a CCDF curve for SC-CPS-OQAM (optimized). FIG. 12 is a plot 1200 showing examples of the pulse-shaping filter $h_f$ for both cases of the SRRC design (line 1220) and the more optimized design (line 1210). The shapes are non-limiting, and other shapes are also contemplated.

Referring still to FIG. 11, the single carrier circularly pulse-shaped waveforms (lines 1130, 1140, 1150, 1160) may outperform DFT-s-OFDM (line 1120) by a substantial margin. The gain, for the SRRC design, in this example is about 2 dB when QAM data symbols are transmitted, and the gain may increase to 3 dB when OQAM data symbols are adopted. An additional 0.7 to 1 dB gain may be obtained after further optimization of the pulse-shaping filter $h_f$.

As discussed above, embodiments of the present disclosure include systems, devices, and methods for a single carrier modulation that is constructed by using a circular convolution for the synthesis. This construction follows the principles based on which OFDM waveforms are constructed, and as a result many benefits of OFDM can be taken advantage of. These benefits may include easy adoption to MIMO channels and the use of various windowing and filtering methods to control the OOB emissions. In addition, the waveforms generated by the disclosed embodiments offer significant gains in PAPR over DFT-s-OFDM. DFT-s-OFDM is the current industry standard for minimizing PAPR in OFDM-based waveforms. The circularly pulse-shaped waveforms may also enable CFO compensation of the FFT demodulator block at the receiver according to embodiments of the disclosure. The flexibility of this class of waveforms may reduce the receiver complexity in comparison to conventional OFDM when a receiver receives signals from a number of users with different CFOs.

Additional non-limiting embodiments include:

Embodiment 1. A transmitting device, comprising: a transmitter including a processor and communication elements, the transmitter configured to: generate an output signal exhibiting a circularly pulse-shaped waveform constructed by using a circular convolution for pulse shaping during synthesis of an input data signal; reduce peak-to-average-power-ratio (PAPR) of the output signal responsive to performing single carrier modulation of the input data signal using a pulse shaping filter in the frequency domain; and transmit the output signal to a receiving device as a single carrier modulated circularly pulse-shaped waveform.

Embodiment 2. The transmitting device of Embodiment 1, wherein the output signal is a multiple-input multiple-output (MIMO) signal.

Embodiment 3. The transmitting device of Embodiment 1 or Embodiment 2, wherein the transmitter is configured to modulate data symbols for the single carrier modulation waveform using QAM modulation.

Embodiment 4. The transmitting device of any of Embodiments 1 through 3, wherein the transmitter is configured to modulate data symbols for the single carrier modulation waveform using OQAM modulation.

Embodiment 5. The transmitting device of any of Embodiments 1 through 4, wherein the input data signal includes a vector of data symbols in the time domain.

Embodiment 6. The transmitting device of any of Embodiments 1 through 5, wherein the output signal includes at least one data packet including a block of MN samples, wherein M is a number of data blocks and N is a number of samples within each data block, and wherein M and N are integers greater than one.

Embodiment 7. The transmitting device of Embodiment 6, wherein the at least one data packet further includes a single cyclic prefix that serves the block of MN samples.

Embodiment 8. The transmitting device of any of Embodiments 1 through 7, wherein the circularly pulse-shaped waveform includes a summation of complex-valued sinusoidal tones.

Embodiment 9. The transmitting device of any of Embodiments 1 through 8, further comprising an electronic device incorporating the transmitter.

Embodiment 10. A method of generating a block of circularly pulse-shaped waveforms, the method comprising: receiving a string of data symbols with a processor of a transmitter; spreading the string of data symbols across a number of tones in the frequency domain with the processor; summing the tones with the processor; circularly shifting and accumulating a result of the summing with the processor; generating an output signal with the processor by serializing a result of the circularly shifting and accumulating; and transmitting the output signal wirelessly via communication elements of the transmitter to a receiving device.

Embodiment 11. The method of Embodiment 10, wherein spreading the string of data symbols across a number of tones includes: applying an L-point fast Fourier transform (FFT) operation that is repeated K times to generate a vector in the frequency domain; and applying a pulse-shaping filter to the vector in the frequency domain at a frequency band of interest.

Embodiment 12. The method of Embodiment 10 or Embodiment 11, wherein summing the tones includes passing the tones with the string of data symbols through an inverse fast Fourier transform (IFFT).

Embodiment 13. The method of any of Embodiments 10 through 12, further comprising adding a cyclic prefix to the result of the circularly shifting and accumulating.

Embodiment 14. The method of any of Embodiments 11 through 13, wherein the pulse-shaping filter $h_f[k]$ is a band-limited filter for the frequency band of interest.

Embodiment 15. The method of Embodiment 14, wherein the pulse-shaping filter $h_f[k]$ satisfies the following constraint $1-\epsilon_1 \le h_f[k] \le 1+\epsilon_1$, for $0 \le k \le L_1$ wherein $\epsilon_1$ is a design parameter of the transmitter, and $L_1$ is a number of frequency domain samples for the pulse-shaping filter $h_f[k]$.

Embodiment 16. The method of Embodiment 15, wherein the pulse-shaping filter in the time domain is defined as:

$$h[n] = \frac{1}{N}\left(h_f[0] + 2\sum_{k=1}^{L_1} h_f[k]\cos\left(\frac{2\pi}{N}kn\right)\right).$$

Embodiment 17. The method of any of Embodiments 11 through 16, wherein the pulse-shaping filter is a band-pass filter centered at a predetermined subcarrier band.

Embodiment 18. A receiving device for processing a data signal exhibiting a single carrier modulation waveform, the receiving device comprising: a receiver including a process and communication elements, the receiver configured to: receive a data signal having single carrier modulated circularly pulse-shaped waveform; and generate estimates of data symbols $s_0$ through $s_{L-1}$ that are spread across a number of tones responsive to performing a reverse signal synthesis to the data signal via a fast Fourier transform (FFT) demodulator block of the receiver.

Embodiment 19. The receiving device of Embodiment 18 or Embodiment 19, wherein the receiver is further configured to perform interpolation among multi-tones associated with the data signal having the single carrier modulated circularly pulse-shaped waveform to compensate for carrier frequency offset (CFO) of the FFT demodulator block of the receiver for users of a multi-user network having different CFOs.

Embodiment 20. The receiving device of any of Embodiments 18 through 20, wherein the receiver is further configured to: remove cyclic prefix from the data signal; apply an IFFT to the received signal; and apply a signal-tap equalizer per tone in the frequency domain to reduce channel impact on signal tones of the received signal.

Embodiment 21. A communication system, comprising: a transmitter including a processor and communication elements, the transmitter configured to: generate an output signal exhibiting a circularly pulse-shaped waveform constructed by using a circular convolution for pulse shaping during synthesis of an input data signal; reduce peak-to-average-power-ratio (PAPR) of the output signal responsive to performing single carrier modulation of the input data signal using a pulse shaping filter in the frequency domain; and transmit the output signal as a single carrier modulated circularly pulse-shaped waveform; and a receiver including a processor and communication elements, the receiver configured to: receive the output signal from the transmitter; and generate estimates of data symbols $s_0$ through $s_{L-1}$ that are spread across a number of tones responsive to performing a reverse signal synthesis to the data signal via a fast Fourier transform (FFT) demodulator block of the receiver.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention. Further, embodiments of the disclosure have utility with different and various detector types and configurations.

What is claimed is:

1. A method of generating a block of circularly pulse-shaped waveforms, the method comprising: receiving a string of data symbols with a processor of a transmitter; spreading the string of data symbols across a number of complex-valued sinusoidal tones in the frequency domain with the processor, each complex-valued sinusoidal tone of the number of complex-valued sinusoidal tones associated with a different subcarrier band; summing the complex-valued sinusoidal tones with the processor; circularly shifting and accumulating a result of the summing with the processor; generating an output signal with the processor by serializing a result of the circularly shifting and accumulating; and transmitting the output signal wirelessly via communication elements of the transmitter to a receiving device, wherein spreading the string of data symbols across a number of tones includes: applying an L-point fast Fourier transform (FFT) operation that is repeated K times to generate a vector in the frequency domain; and applying a pulse-shaping filter hf[k] to the vector in the frequency domain at a frequency band of interest.

2. The method of claim 1, wherein summing the complex-valued sinusoidal tones includes passing the complex-valued sinusoidal tones with the string of data symbols through an inverse fast Fourier transform (IFFT).

3. The method of claim 1, further comprising adding a cyclic prefix to the result of the circularly shifting and accumulating.

4. The method of claim 1, wherein the pulse-shaping filter $h_f[k]$ is a band-limited filter for the frequency band of interest.

5. The method of claim 4, wherein the pulse-shaping filter $h_f[k]$ satisfies the following constraint $1-\epsilon 1 \leq hfk \leq 1+\epsilon 1$, for $0 \leq k \leq L1$ wherein $\epsilon 1$ is a design parameter of the transmitter, and $L_1$ is a number of frequency domain samples for the pulse-shaping filter $h_f[k]$.

6. The method of claim 5, wherein the pulse-shaping filter in the time domain is defined as:

$$h[n] = \frac{1}{N}\left(h_f[0] + 2\sum_{k=1}^{L_1} h_f[k]\cos\left(\frac{2\pi}{N}kn\right)\right).$$

7. The method of claim 1, wherein the pulse-shaping filter is a band-pass filter centered at a predetermined subcarrier band.

8. A receiving device for processing a data signal exhibiting a single carrier modulation waveform, the receiving device comprising:
   a receiver including a processor, the receiver configured to:
      receive a data signal having a single carrier modulated circularly pulse-shaped waveform;
      generate estimates of data symbols $\square_0$ through $s_{L-1}$ that are spread across a number of complex-valued sinusoidal signal tones responsive to performing a reverse signal synthesis to the data signal via a fast Fourier transform (FFT) demodulator block of the receiver; and
      perform interpolation among multi-tones associated with the data signal having the single carrier modulated circularly pulse-shaped waveform to compensate for carrier frequency offset (CFO) of the FFT demodulator block of the receiver for users of a multi-user network having different CFOs.

9. A receiving device for processing a data signal exhibiting a single carrier modulation waveform, the receiving device comprising:
   a receiver including a processor, the receiver configured to:
      receive a data signal having a single carrier modulated circularly pulse-shaped waveform;
      generate estimates of data symbols $\square_0$ through $s_{L-1}$ that are spread across a number of complex-valued sinusoidal signal tones responsive to performing a reverse signal synthesis to the data signal via a fast Fourier transform (FFT) demodulator block of the receiver;

remove cyclic prefix from the data signal;

apply an IFFT to the received data signal; and apply a single-tap equalizer per each complex-valued sinusoidal signal tone in the frequency domain to reduce channel impact on the complex-valued sinusoidal signal tones of the received signal.

10. A communication system, comprising:

a transmitter including a processor, the transmitter configured to:

receive an input data signal including a vector of data symbols;

expand a length of the vector to be equal to a length of a pulse shaping filter;

generate an output signal exhibiting a single carrier circularly pulse-shaped waveform constructed by using a circular convolution for pulse shaping during synthesis of the data symbols of the input data signal;

reduce peak-to-average-power-ratio (PAPR) of the output signal responsive to performing single carrier modulation of the input data signal using a pulse shaping filter in the frequency domain; and transmit the output signal including the single carrier modulated circularly pulse-shaped waveform; and a receiver including a processor, the receiver configured to:

receive the output signal from the transmitter; and generate estimates of data symbols $\square_0$ through $s_{L-1}$ that are spread across a number of complex-valued sinusoidal signal tones responsive to performing a reverse signal synthesis to the output signal via a fast Fourier transform (FFT) demodulator block of the receiver.

* * * * *

UNITED STATES PATENT AND TRADEMARK OFFICE
CERTIFICATE OF CORRECTION

PATENT NO. : 10,652,072 B2  
APPLICATION NO. : 15/593691  
DATED : May 12, 2020  
INVENTOR(S) : Hussein Moradi and Behrouz Farhang Page 1 of 1

It is certified that error appears in the above-identified patent and that said Letters Patent is hereby corrected as shown below:

In the Specification  
Column 8, Line 33, change "signal-tap equalizer" to --single-tap equalizer--  
Column 17, Line 25, change "a signal-tap" to --a single-tap--

Signed and Sealed this  
Third Day of November, 2020

Andrei Iancu  
*Director of the United States Patent and Trademark Office*